US007282076B2

(12) United States Patent
Mahan

(10) Patent No.: US 7,282,076 B2
(45) Date of Patent: Oct. 16, 2007

(54) AIR BOX LID HAVING AN INTEGRATED FILTER

(76) Inventor: Dennis Ward Mahan, 15187 Willow St., Hesperia, CA (US) 92345

( * ) Notice: Subject to any disclaimer, the term of this patent is extended or adjusted under 35 U.S.C. 154(b) by 313 days.

(21) Appl. No.: 10/937,659

(22) Filed: Sep. 8, 2004

(65) Prior Publication Data

US 2005/0076625 A1 Apr. 14, 2005

Related U.S. Application Data

(60) Provisional application No. 60/501,493, filed on Sep. 8, 2003.

(51) Int. Cl.
*B01D 46/00* (2006.01)

(52) U.S. Cl. ............................ 55/482; 55/495; 55/497; 55/503

(58) Field of Classification Search .................. 55/482, 55/486, 487, 488, 489, 350.1, 318, 320, 327, 55/522, 527, 528, 385.1, 385.3, 495, 497, 55/503, DIG. 28, DIG. 31; 95/286, 287; 210/500.1

See application file for complete search history.

(56) References Cited

U.S. PATENT DOCUMENTS

| | | | | |
|---|---|---|---|---|
| 1,215,974 | A | 2/1917 | Orem | |
| 261,654 | A | 10/1952 | Strinden | |
| 2,966,339 | A | 12/1960 | Morgan | |
| 4,169,512 | A | 10/1979 | Ishikawa et al. | |
| 4,722,747 | A | 2/1988 | Armbruster | |
| 4,995,891 | A * | 2/1991 | Jaynes | 55/419 |
| 5,160,519 | A * | 11/1992 | Svensson et al. | 55/482 |
| 5,368,621 | A * | 11/1994 | Pool | 55/385.3 |
| 5,397,632 | A | 3/1995 | Murphy, Jr. et al. | |
| 5,688,299 | A | 11/1997 | Goodwin | |
| 5,891,207 | A | 4/1999 | Katta | |
| 6,216,661 | B1 * | 4/2001 | Pickens et al. | 123/198 E |
| 6,312,489 | B1 | 11/2001 | Ernst et al. | |
| 6,572,667 | B1 * | 6/2003 | Greif et al. | 55/323 |
| 6,884,274 | B2 * | 4/2005 | Niakan et al. | 55/486 |
| 7,025,799 | B2 * | 4/2006 | Peterson | 55/385.3 |
| 2002/0069624 | A1 | 6/2002 | Jaramillo et al. | |
| 2002/0184863 | A1 | 12/2002 | Bergami | |
| 2003/0051453 | A1 * | 3/2003 | Moreau et al. | 55/385.3 |
| 2003/0177745 | A1 * | 9/2003 | Jauw | 55/497 |

* cited by examiner

*Primary Examiner*—Duane Smith
*Assistant Examiner*—Robert Clemente

(57) ABSTRACT

An integrated filter lid has a filter surrounded by an outer frame. The outer frame is adapted to seal around an inlet opening of an air box which has a primary filter for filtering air prior to being provided to an engine. The integrated filter lid covers the inlet opening of the air box and filters the air before the air enters the air box. With integrated filter, outside air is filtered at least twice before being provided to an engine, the first time by the filter in the integrated filter, and the second time by the primary filter in the air box. The integrated filter also increases the flow of air into the air box, thereby enhancing performance of the engine.

13 Claims, 3 Drawing Sheets

AIR BOX LID HAVING AN INTEGRATED FILTER

RELATED APPLICATION

This application claims priority to U.S. Provisional Application No. 60/501,493, filed Sep. 8, 2003, which is hereby incorporated by reference.

BACKGROUND OF THE INVENTION

1. Field of the Invention

This application is related to filtering of air for engines, and more particularly to an air box lid having an integrated filter.

2. General Background and State of the Art

The air used by engines in motor vehicles is typically filtered prior to being provided to the engines. A primary filter for filtering air is often installed inside of an air box, which is used to supply air to the engine. The air box also has an opening at the top for installation of the primary filter. Once the primary filter is installed, a lid is mounted on the air box to close the opening so that dirt or other debris, including water, is kept from entering the air box through the opening to damage and/or degrade the performance of the primary filter.

In order to improve engine performance, small holes have been drilled on the lid and/or air box to insert small foam filters in the holes in order to increase air flow into the air box, and ultimately to the engine. This requires the user to modify the air box. Further, the resulting improvement to the air flow is often disappointing. One other known method to increase air flow has been to remove the lid completely, which then leaves the primary filter completely exposed to the environment.

INVENTION SUMMARY

In one exemplary embodiment according to the present invention is provided a lid for an air box, said lid having a filter-integrated thereon. The filter is used to increase the flow of air into the air box, thereby enhancing performance of the engine. The lid may be used with the air box for any gas or diesel powered vehicle using an air intake system that includes an air box containing an air filter and ducting to direct air to the engine. The motor vehicle in which the lid is used may include cars, trucks, motorcycles and all terrain vehicles (ATV), for example.

In an exemplary embodiment according to the present invention, an air box lid is provided. The air box lid includes: a frame adapted to be mounted on an air box; and a filter-integrated to the frame. The air box lid, for example, may be mounted on the air box using fasteners used to secure a conventional lid. By providing the filter on the air box lid, air flow to the engine is increased while air is first filtered prior to being applied to a primary filter within the air box.

In another exemplary embodiment according to the present invention, the filter has a pleated filtering surface so as to increase surface area that makes contact with air, thereby increasing air flow into the air box.

In yet another exemplary embodiment according to the present invention, the filter in the air box lid is fabricated from four-ply cotton gauze, two-ply wire mesh.

In still another exemplary embodiment according to the present invention, an air box assembly is provided. The air box assembly includes: an air box lid; an air box having means for fastening the air box lid to the air box; and a primary filter installed in the air box. The air box lid includes: a frame adapted to be mounted on the air box; and a filter-integrated to the frame. By providing the integrated filter on the air box lid, air flow to the engine is increased while air is first filtered prior to being applied to the primary filter such that air may be filtered at least twice prior to being applied to the engine. Further, it eliminates the need to modify the air box or the conventional lid to enhance engine performance.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

These and other aspects of the invention will be more readily comprehended in view of the discussion herein and accompanying drawings, in which like reference numerals designate like elements.

DETAILED DESCRIPTION OF THE PREFERRED EMBODIMENTS

Figure 1:
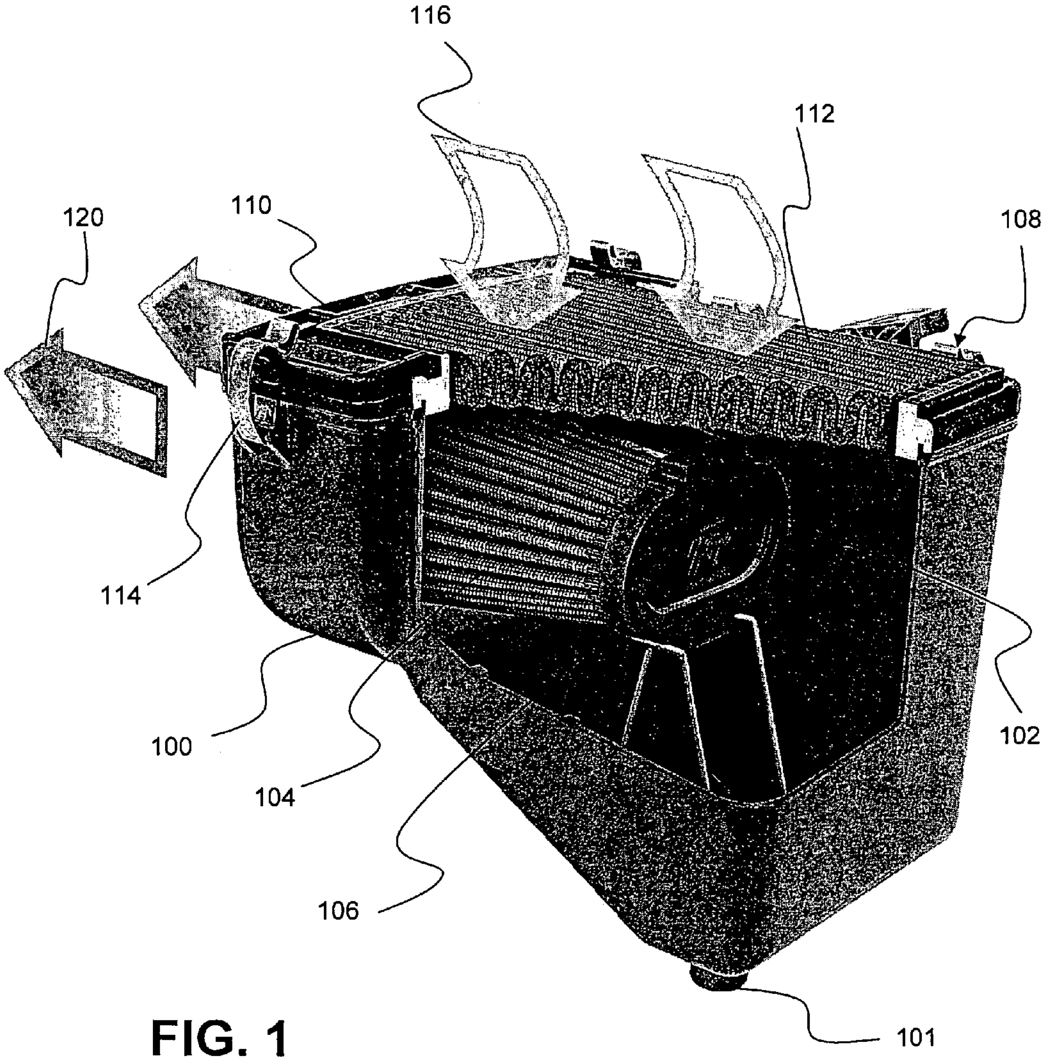
FIG. 1 is a partial cross-sectional perspective view of a lid having an integrated filter in an exemplary embodiment according to the present invention, mounted on an air box.

In an exemplary embodiment according to the present invention, an air box lid having an integrated filter 108 is installed on an air box 100. The lid having an integrated filter 108 may also be referred to as a POWERLID™ or a filter-integrated lid. The filter-integrated lid 108 has a frame 110 and a filter 112. The filter 112 has been integrated with the frame 110, which surrounds the periphery of the filter 112. The filter-integrated lid 108 is removably attached to the air box 100 using fasteners, such as clips 114 mounted on the air box 100. The clips 114, for example, may be conventional clips for securing a conventional lid (not shown) to the air box 100. The air box 100 has an outlet 101 to drain water that may enter the air box.

The filter-integrated lid 108 has a generally rectangular shape, but can be adapted to any shape opening. The filter 112 is made of a four-ply cotton gauze, two-ply wire mesh, but may be fabricated out of any suitable filtering media. Further, the filter 112 has a generally rectangular shape, but can be adapted to any shape opening. The frame 110 also has a generally rectangular shape with a generally rectangular opening used to mounted the filter 112, but can be adapted to any shape opening. The frame 110 may be made of plastic or any other material suitable for fabrication of an air box lid. Further, the frame 110, for example, may be fabricated using molding, stamping and/or any other suitable manufacturing process. In other embodiments, the air box lid 108, the frame 110 and/or the filter 112 may have other shapes based on the shape of the air box, aesthetics and/or other considerations.

When a standard air lid is used, the air box receives air through a snorkel that is molded into or attached to the standard air box lid. This air is typically not filtered prior to reaching the primary filter.

Using the filter-integrated lid 108, the air box receives air as indicated by air flow arrows 116. Hence, the air that enters the air box through the filter-integrated lid 108 is first filtered prior to reaching the primary filter 102. Therefore, double filtered air can be provided to the engine. Further, the primary filter 102 may be kept relatively clean because of the pre-filtering by the filter 112. The air box has an outlet (not shown) through which the filtered air exits and is provided to the engine as indicated by air flow arrows 120.

The primary filter 102 as shown in FIG. 1 has a four-ply cotton gauze, two-ply wire mesh filter 104 and a top 106. The filter 104 is made of a four-ply cotton gauze, two-ply wire mesh, but may be fabricated out of any suitable filtering media and has a generally elliptical cone shape with the side facing the outlet being larger than the opposing side, but can be made into any shape to fit a specific application. The four-ply cotton gauze, two-ply wire mesh filter 104 has a pleated surface so as to increase the surface area exposed to the air. The base 106 has a generally elliptical shape but can be made into any shape to fit a specific application, and is attached to the side of the filter 104 opposite the side facing the outlet. In other embodiments, the primary filter may have any other suitable design. Further, the filtering element of the primary filter may be made of other suitable filtering material in other embodiments. For example, the primary filter may include cylindrical foam in other air boxes on which the filter-integrated lid is mounted.

Figure 2:
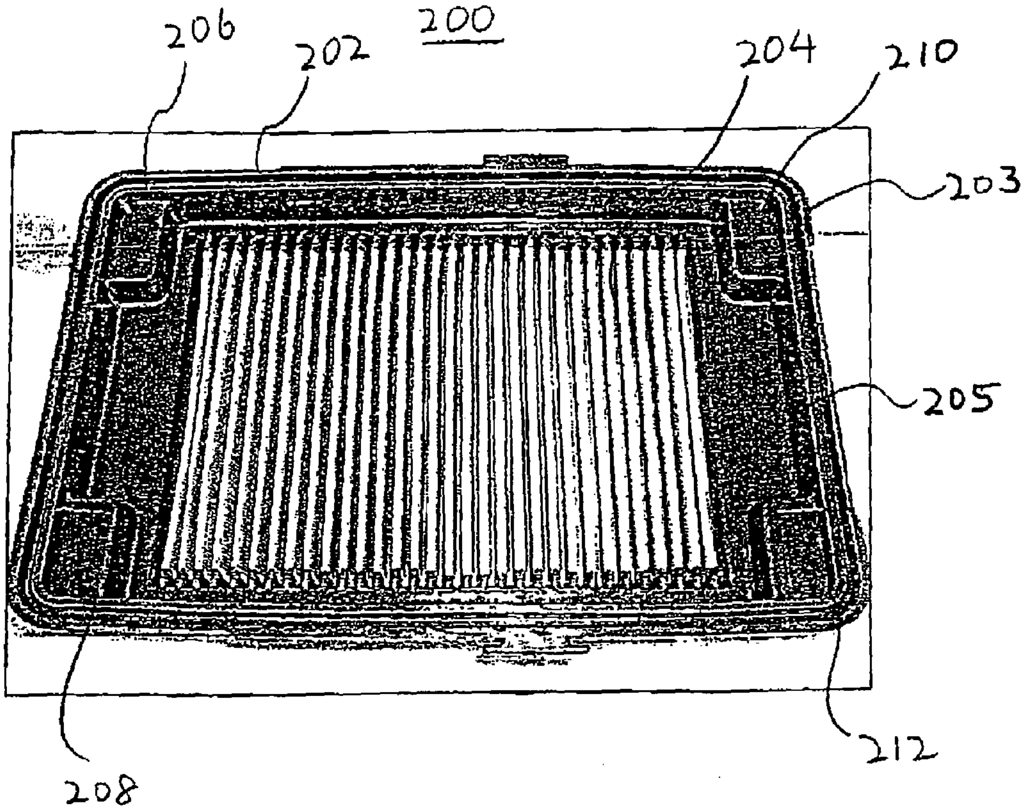
FIG. 2 is a top view picture of a lid having an integrated filter in another exemplary embodiment according to the present invention.

FIG. 2 is a top view picture of a filter-integrated lid 200 in another exemplary embodiment according to the present invention. The filter-integrated lid 200 has a filter 204 integrated with a frame 202 surrounding it. The filter-integrated lid 200 has a generally rectangular shape, but can be adapted to any shape opening. The filter 202 may be fabricated using a four-ply cotton gauze, two-ply wire mesh or any other suitable material used to fabricate air filters. The filter 204 has a pleated surface so as to increase the surface area exposed to the air.

The frame 202 has a generally rectangular shape, but can be adapted to any shape opening, and includes an outer frame 203 and an inner frame 205. The filter is surrounded by and integrated with the inner frame 205. The inner frame 205 has a substantially rectangular opening to accommodate the filter 204, but can be adapted to fit any shape opening.

The outer frame 203 has a generally rectangular shape, but can be adapted to fit any shape opening. The outer frame 203 includes a generally rectangular opening, but can be adapted to fit any shape inner frame. The periphery of the opening of the outer frame 203 is attached to the periphery of the inner frame 205. The outer frame 203 is at a different waterline than the inner frame 205 when the lid 200 is mounted on an air box. The inner frame steps up to the outer frame at four corner steps 206, 208, 210 and 212. The frame 202 may be made of plastic or any other suitable material, and may be fabricated using molding, stamping or any other suitable manufacturing process. The outer frame 203 and the inner frame 205 may be made as a single integrated piece or as two or more pieces that are affixed (e.g., permanently) to each other.

Each of the steps 206, 208, 210, and 212 at the four corners of the frame 202 has a generally rectangular shape, but can be adapted to fit any shape opening, and may be used to removably attach the lid 200 to the air box using standard fasteners such as, for example, the clips 114 of FIG. 1

Figure 3:
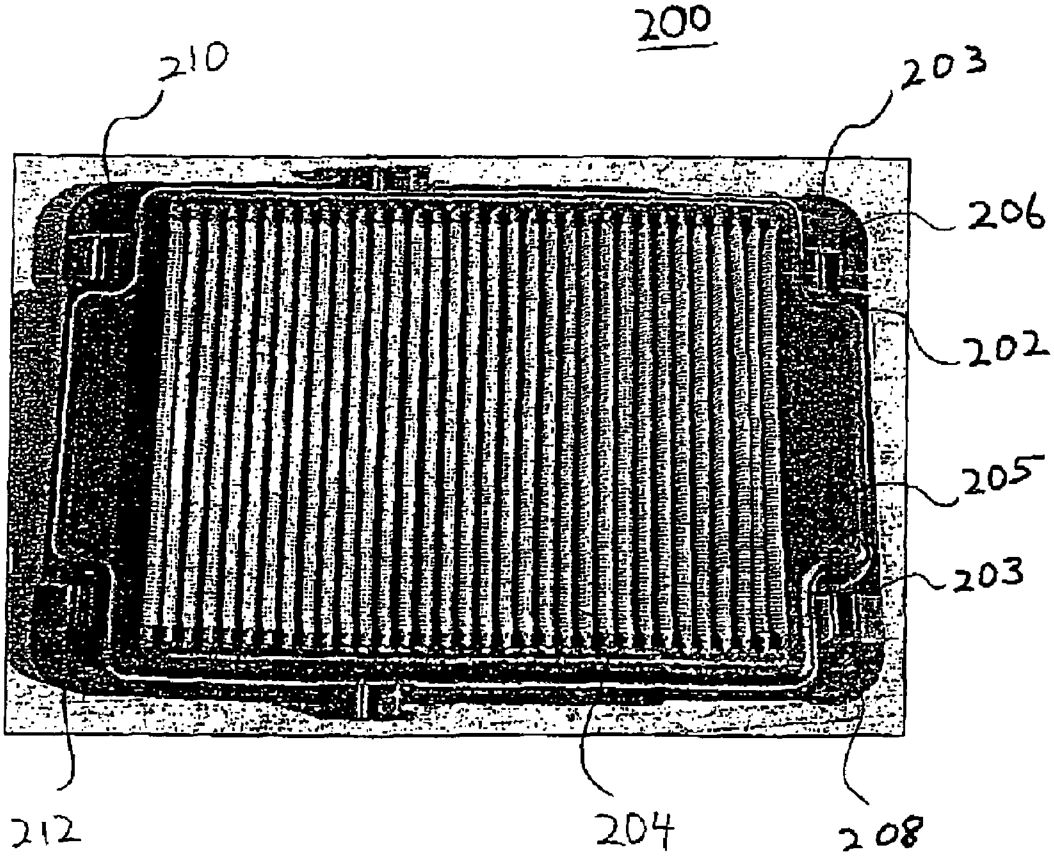
FIG. 3 is a bottom view picture of the lid having an integrated filter of FIG. 2.

FIG. 3 is a bottom view picture of the filter-integrated lid 200. It can be seen in FIG. 3 that the filter 204 is integrated with the inner frame 205, and is at a different waterline than that of the outer frame 203 when the filter-integrated 200 is mounted on the air box.

It will be appreciated by those of ordinary skill in the art that the invention can be embodied in other specific forms without departing from the spirit or essential character thereof. The present invention is therefore considered in all respects to be illustrative and not restrictive.

What is claimed is:

1. An air box assembly comprising:

an air box having an inlet opening and an outlet opening, the inlet opening formed on a top side of the air box and having a predetermined configuration adapted to receive air into the air box;

a lid having a first filter surrounded by an outer frame, the outer frame adapted to substantially seal around the predetermined configuration of the inlet opening of the air box, the first filter adapted to substantially enclose the inlet opening of the air box so that air passing through the inlet opening is substantially filtered by the first filter before entering into the air box, where the lid has an inner frame between the first filter and the outer frame, the inner frame steps up to the outer frame so that the inner frame has a different waterline than the outer frame to substantially prevent water from penetrating the first filter; and a second filter adapted to seal around the outlet opening of the air box, the second filter adapted to substantially filter the air inside the air box before the air exit through the outlet opening of the air box.

2. The assembly according to claim 1, where the predetermined configuration of the inlet opening has a substantially rectangular shape and the outer frame of the lid has the substantially rectangular shape to seal around the substantially rectangular shape of the inlet opening of the air box.

3. The assembly according to claim 1, where the air box has clips around the inlet opening adapted to releasably hold the first filter lid around the inlet opening.

4. The assembly according to claim 1, where the second filter has an elliptical shape.

5. The assembly according to claim 1, where the first filter is pleated to increase the surface area of the first filter.

6. The assembly according to claim 1, where the first filter is fabricated from four-ply cotton gauze and two-ply wire mesh.

7. The assembly according to claim 1, where the first filter is directly exposed to the atmosphere so that air passes through the first filter without first passing through a snorkel.

8. The assembly according to claim 1, where the predetermined configuration of the inlet opening of the air box is substantially similar to the outer configuration of the air box.

9. An integrated filter lid adapted to enclose an inlet opening of an air box having a primary filter, the integrated filter lid comprising:

a filter having an outer periphery; and an outer frame around the outer periphery of the filter, the outer frame adapted to seal around the inlet opening of the air box so that air is filtered by the filter before being filtered again by the primary filter within the air box; and an inner frame between the filter and the outer frame, the inner frame stepping up to the outer frame so that the inner frame has a different waterline than the outer frame to substantially prevent water from penetrating the filter.

10. The integrated filter lid according to claim 9, where the filter has a rectangular outer configuration.

11. The integrated filter lid according to claim 9, where the filter is pleated to increase the surface area of the filter.

12. The integrated filter lid according to claim 9, where the filter is fabricated from four-ply cotton gauze and two-ply wire mesh.

13. The integrated filter lid according to claim 9, where the integrated filter lid is adapted to replace a lid having a snorkel.

* * * * *